United States Patent [19]

Miller

[11] Patent Number: 4,958,338
[45] Date of Patent: Sep. 18, 1990

[54] HIERARCHICALLY MULTIPLEXED OPTICAL RECORDING SYSTEM FOR STORAGE OF DIGITAL DATA

[76] Inventor: William P. Miller, 581 Alta Vista Dr., Sierra Madre, Calif. 91024

[21] Appl. No.: 239,617

[22] Filed: Sep. 1, 1988

Related U.S. Application Data

[63] Continuation-in-part of Ser. No. 936,237, Dec. 1, 1986, abandoned.

[51] Int. Cl.$^5$ .............................. G11B 7/125
[52] U.S. Cl. ...................................... 369/59
[58] Field of Search ............. 369/94, 95, 102, 103, 369/59, 108, 109, 111; 360/40; 365/120, 124, 125, 127

[56] References Cited

U.S. PATENT DOCUMENTS

| | | | |
|---|---|---|---|
| 3,281,151 | 10/1966 | Kaprelian et al. | 369/94 |
| 3,407,405 | 10/1968 | Hoadley | 365/125 |
| 3,408,656 | 10/1968 | Lamberts | 365/125 |
| 3,635,545 | 1/1972 | VanKerkhove et al. | 365/125 |
| 3,704,929 | 12/1972 | Sakaguchi et al. | 365/125 |
| 3,946,367 | 3/1976 | Wohlmut et al. | 369/94 |
| 3,969,593 | 7/1976 | Vlahos | 369/102 |
| 4,025,731 | 5/1977 | Rembault | 369/102 |
| 4,375,096 | 2/1983 | Gorog et al. | 369/116 |
| 4,394,661 | 7/1983 | Peeters | 369/94 |
| 4,544,961 | 10/1985 | Chi | 360/40 |
| 4,783,776 | 11/1988 | Ishigaki et al. | 369/102 |

OTHER PUBLICATIONS

Tseng; "Encoding Schemes for Video Disk", IBM TDB, vol. 24, No. 3, Aug. 1981.
"Digital Data Storage", *Handbook of Optical Holography*, Caulfield, A. J., Academic Press Inc., 1979, chapter 10.

*Primary Examiner*—Vincent P. Canney
*Attorney, Agent, or Firm*—Ashen, Golant, Martin & Seldon

[57] ABSTRACT

Apparatus and method for converting a series of discrete units of incoming digital data into a set of integer values and representing said values holographically, by dimensionalizing multiple aspects of reference laser signal, and multiplexing said aspects at the same storage location. The integer set is represented logarithmically by manipulating the dimensionalized aspects in a hierarchical order, resulting in a 16-fold increase in data density at the same physical storage location, as compared with a conventional binary storage system.

7 Claims, 5 Drawing Sheets

ABBREVIATIONS:  A = ANGLE OF INCIDENCE
                F = FREQUENCY BANDWIDTH
                O = PROPERTY LEVEL "OFF"
                * = PROPERTY LEVEL "ON"

| MULTIPLEXED BIT | | | | DECIMAL EQUIVALENT | BINARY EQUIVALENT |
|---|---|---|---|---|---|
| A4 | A3 | A2 | A1 | | |
| F4 F3 F2 F1 | F4 F3 F2 F1 | F4 F3 F2 F1 | F4 F3 F2 F1 | | |
| 0 0 0 0 | 0 0 0 0 | 0 0 0 0 | 0 0 0 0 | 0 | 0 |
| 0 0 0 0 | 0 0 0 0 | 0 0 0 0 | 0 0 0 * | 1 | 1 |
| 0 0 0 0 | 0 0 0 0 | 0 0 0 0 | 0 0 * 0 | 2 | 10 |
| 0 0 0 0 | 0 0 0 0 | 0 0 0 0 | 0 0 * * | 3 | 11 |
| 0 0 0 0 | 0 0 0 0 | 0 0 0 0 | 0 * 0 0 | 4 | 100 |
| 0 0 0 0 | 0 0 0 0 | 0 0 0 0 | 0 * 0 * | 5 | 101 |
| 0 0 0 0 | 0 0 0 0 | 0 0 0 0 | 0 * * 0 | 6 | 110 |
| 0 0 0 0 | 0 0 0 0 | 0 0 0 0 | 0 * * * | 7 | 111 |
| 0 0 0 0 | 0 0 0 0 | 0 0 0 0 | * 0 0 0 | 8 | 1000 |
| 0 0 0 0 | 0 0 0 0 | 0 0 0 0 | * 0 0 * | 9 | 1001 |
| 0 0 0 0 | 0 0 0 0 | 0 0 0 0 | * 0 * 0 | 10 | 1010 |
| 0 0 0 0 | 0 0 0 0 | 0 0 0 0 | * 0 * * | 11 | 1011 |
| 0 0 0 0 | 0 0 0 0 | 0 0 0 0 | * * 0 0 | 12 | 1100 |
| 0 0 0 0 | 0 0 0 0 | 0 0 0 0 | * * 0 * | 13 | 1101 |
| 0 0 0 0 | 0 0 0 0 | 0 0 0 0 | * * * 0 | 14 | 1110 |
| 0 0 0 0 | 0 0 0 0 | 0 0 0 0 | * * * * | 15 | 1111 |
| 0 0 0 0 | 0 0 0 0 | 0 0 0 * | 0 0 0 0 | 16 | 10000 |
| 0 0 0 0 | 0 0 0 0 | 0 0 0 * | 0 0 0 * | 17 | 10001 |
| ⋮ | ⋮ | ⋮ | ⋮ | ⋮ | ⋮ |
| 0 0 0 * | * 0 * * | 0 * 0 * | * 0 0 0 | 7000 | 1101101011000 |
| 0 0 0 * | * 0 * * | 0 * 0 * | * 0 0 * | 7001 | 1101101011001 |
| 0 0 0 * | * 0 * * | 0 * 0 * | * 0 * 0 | 7002 | 1101101011010 |
| 0 0 0 * | * 0 * * | 0 * 0 * | * 0 * * | 7003 | 1101101011011 |
| ⋮ | ⋮ | ⋮ | ⋮ | ⋮ | ⋮ |
| * * * * | * * * * | * * * * | * * 0 0 | 65532 | 1111111111111100 |
| * * * * | * * * * | * * * * | * * 0 * | 65533 | 1111111111111101 |
| * * * * | * * * * | * * * * | * * * 0 | 65534 | 1111111111111110 |
| * * * * | * * * * | * * * * | * * * * | 65535 | 1111111111111111 |

TABLE 1

FIG. 5

HIERARCHICALLY MULTIPLEXED OPTICAL RECORDING SYSTEM FOR STORAGE OF DIGITAL DATA

BACKGROUND OF THE INVENTION

This application is a continuation-in-part of U.S. Ser. No. 936,237 which was filed on Dec. 1, 1986, now abandoned, the priority of which is claimed.

1. Field of the Invention

The present invention relates to method and apparatus for the representation, storage and transmission of digital data, and particularly relates to high capacity data storage and retrieval.

2. Description of the Prior Art

Conventional techniques for data storage and handling, such as punched paper cards and tape, magnetic disk and tape devices, semiconductor chips, and recently developed optical storage devices, employ a two state or binary signal known as a "bit" as the basic unit of data representation. Because of the two-stage nature of the bit, data is represented in the form of binary numbers, as it is in the main memory and central processing unit of digital computers.

To represent numerical data such as integers and real numbers, groups or bytes of 16, 32, or 64 bits are commonly formed as the fundamental storage unit. For example, a 16 bit word can represent integer numbers from $-32,767$ to $+32,767$. Text characters, like alphabetic upper and lower-case letters, are represented by standardized values of an eight bit storage unit known as the "byte".

Binary representation of digital data, although in common and widespread use, is not the most efficient utilization of storage media. Various attempts have been made to record more information within each physical storage unit of the recording medium. For example, U.S. Pat. No. 4,544,961 describes a device which magnetically records digital information using two parameters of the recording medium: the polarity of flux change in, and the length of breaks between, magnetized regions.

U.S. Pat. No. 3,969,593 discloses an optical sound recording system for use with motion picture film, in which independent sound channels may be recorded on the same track by using hue variations in superimposed, but different colors. These approaches thereby provide recording systems wherein information is stored via the variations in discretely separate, varying parameters.

Holography provides another approach to digital data recording. An overview of this technology is given in *Handbook of Optical Holography* (Ed. Caulfield, A. J., Academic Press Inc. 1979, Chap. 10). This storage method typically provides a set of superimposed "pages", wherein each page is a two-dimensional matrix of binary digital cells.

It is helpful to describe data recording systems in terms of recording vectors, or dimensions. In U.S. Pat. No. 4,544,961, the recording vectors, or dimensions, were the flux polarity and the spacing between magnetized regions. In U.S. Pat. No. 3,969,593, the recording vectors, or dimensions, were the two colors whose hues were varied to independently store the two soundtracks at the same location. As used herein the term "vector" will be used to denote a detectable variable associated with a unit of storage area on the recording medium.

In conventional binary storage systems, storage capacity is simply a linear function of bit density. In multiplexed systems, wherein more than one item of recorded information may be superimposed at a common location, storage capacity increases exponentially with the addition of each recording vector. Since each vector can reside in one of a variety of states, the representational power of each storage unit is equal to the product of the number of states in which each vector can reside, thereby yielding the exponential relationship.

The multiplexed quantization of these aforementioned systems can be characterized as non-logarithmic, in that each vector of one multiplexed storage unit can exist in one state. Therefore, just one value can be recorded on each vector of each multiplexed unit. In the '961 system, for example, the value of the recorded flux change is either positive or negative at the location of interest. In the '593 system, each color has a single hue value at a given location on the film.

SUMMARY OF THE INVENTION

The present invention provides a digital data representation system consisting of a method for converting an incoming unit of text or numerical data into a hierarchical series of values, each of which is associated with a particular variable vector of the storage medium. The term "data representation system", as used herein, will be used to denote a system which prepares data for storage on a medium in accordance with the invention.

The hierarchical series of values are then stored in a multiplexed manner at a single physical storage location on the recording medium. Storage is accomplished by imparting to the storage location, a total characteristic which is a combination of superimposed dissimilar and separately detectable vectors, each having a respective value. In a preferred embodiment, recordation is by means of a holographic recording technique wherein a sequence of incoming units of data are stored as a sequence of multiplexed holographic spots or bits on the recording media. For ease of reference, the basic unit or location of data storage, whether binary or multiplexed, will continue to be referred to herein as a "bit", even though this term was originally a contraction of the term "binary digit".

Accordingly, a multiplicity of distinct characteristics or properties of a reference laser signal, such as angle of incidence, wavelength, and the like, are recorded at each physical storage location in a "volume" hologram. The properties are assigned a fixed, hierarchical order. For example, successively greater values may be respectively represented by successively greater angles of incidence. After all available values of angles of incidence have been used, the wavelength is changed to a new value, and the value of angles repeated. Thus, the wavelength is a higher order value in the data representation system illustrated in this example. Data is retrieved by reading the wavelength of the stored optical signal in conjunction with the value of its angle of incidence in order to determine the input value represented thereby.

Whereas the storage capacity of the media increases linearly as a function of bit density in a conventional binary storage system, the present invention exhibits storage capacity which increases linearly with the density of the holographic spots, and logarithmically with the number of properties, or vectors, which are varied. In the foregoing example, the recorded properties (i.e., vectors) of the reference laser signals are superimposed (i.e., multiplexed) in each holographic bit.

Thus, a major advantage of the present invention is the substantially increased storage capacity for the data storage media. In the preferred embodiment, described below, there is a 16-fold increase in data density in the same physical storage location, as compared with conventional binary storage. Furthermore, technological advances which increase data density will achieve a logarithmic increase in storage capacity when used in conjunction with the subject invention, as opposed to only the linear increases which would be gained in conjunction with conventional binary systems.

Additionally, since the subject invention increases the amount of information which can be stored at a single physical location on the storage medium, data access time is minimized because more information can be transferred with each read and write operation.

BRIEF DESCRIPTION OF THE DRAWINGS

FIG. 5 is a diagrammatic representation illustrating the the quantizing method used at a single bit location on the recording medium in accordance with the present embodiment, and contrasts the same with decimal and binary counting.

DETAILED DESCRIPTION OF THE PREFERRED EMBODIMENT

Figure 1:
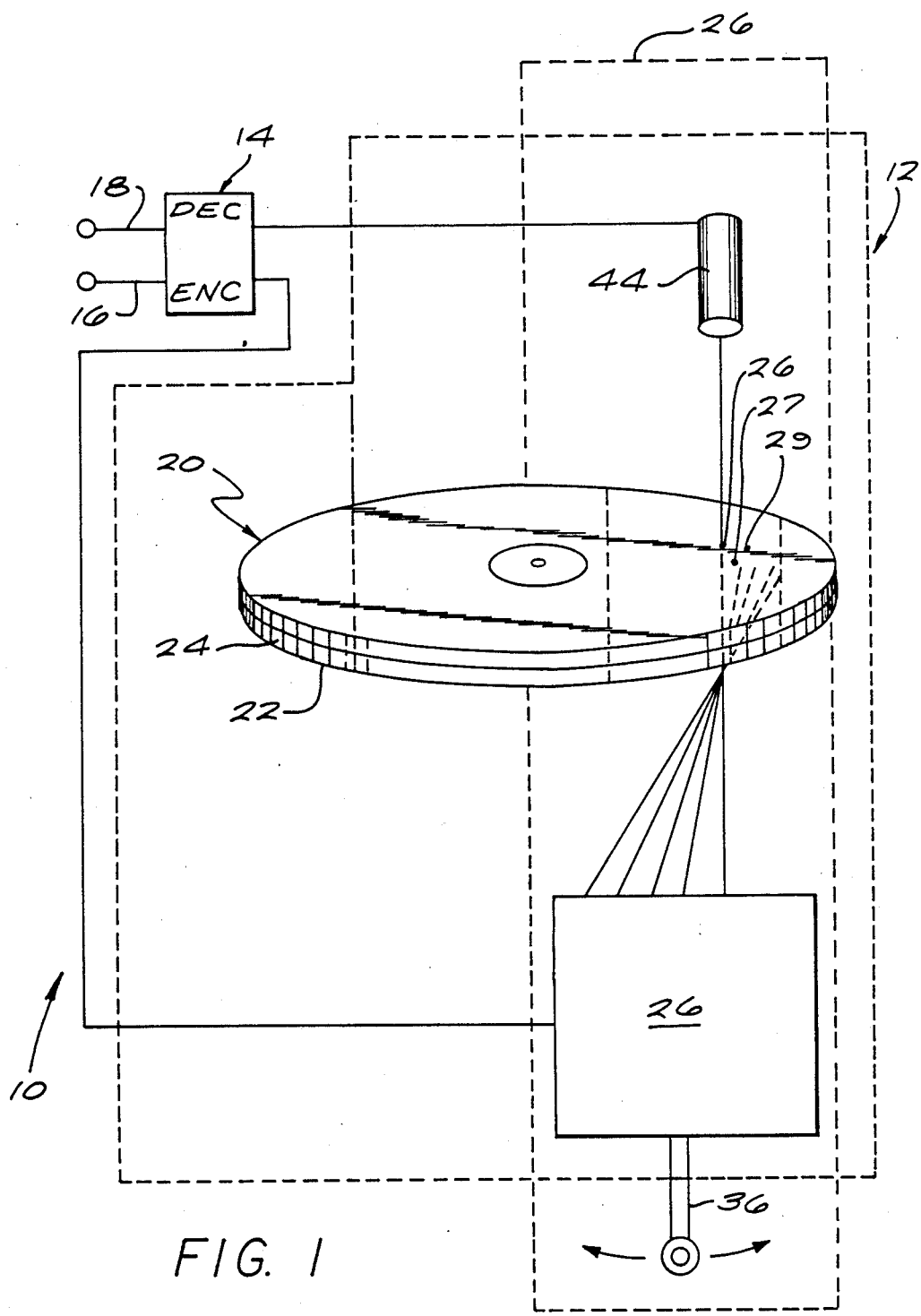
FIG. 1 is a schematic illustration of a data storage and retrieval system constructed in accordance with the invention.

FIG. 1 is a schematic illustration of a data storage and retrieval system 10 constructed in accordance with the invention. Input data is applied to the system 10 through an encoder/decoder device 14. The encoded input data is coupled to a read/write head 26 which records the data on a transparent optical disk 20. Side 22 of disk 20 is coated with photo-sensitive emulsion 24, such as a silver halide or other emulsion suitable for the recording of volume holograms. The stored data is subsequently read by means of a photodetector 44, which is electrically coupled to the encoding portion of the encoder/decoder 14 so that the decoded data can be outputted to a digital computer or other processing equipment.

As will be apparent, some or all of these operations can be performed by a single apparatus, or a series of separately connected devices. The input data can, of course, be from any of a variety of sources, including such data processing equipment as main memory registers, mass storage devices, keyboards, and real-time digital or analog data equipment. Naturally, data from any such analog equipment would first be converted to a digital format by means of a digital-to-analog converter.

The encoder 14 can assume a variety of forms, needing only to be capable of translating the form of input data supplied by the information source, into codes suitable for use by the data storing system herein. In the illustrated embodiment, encoder 14 is a binary digital computer.

Figure 2:
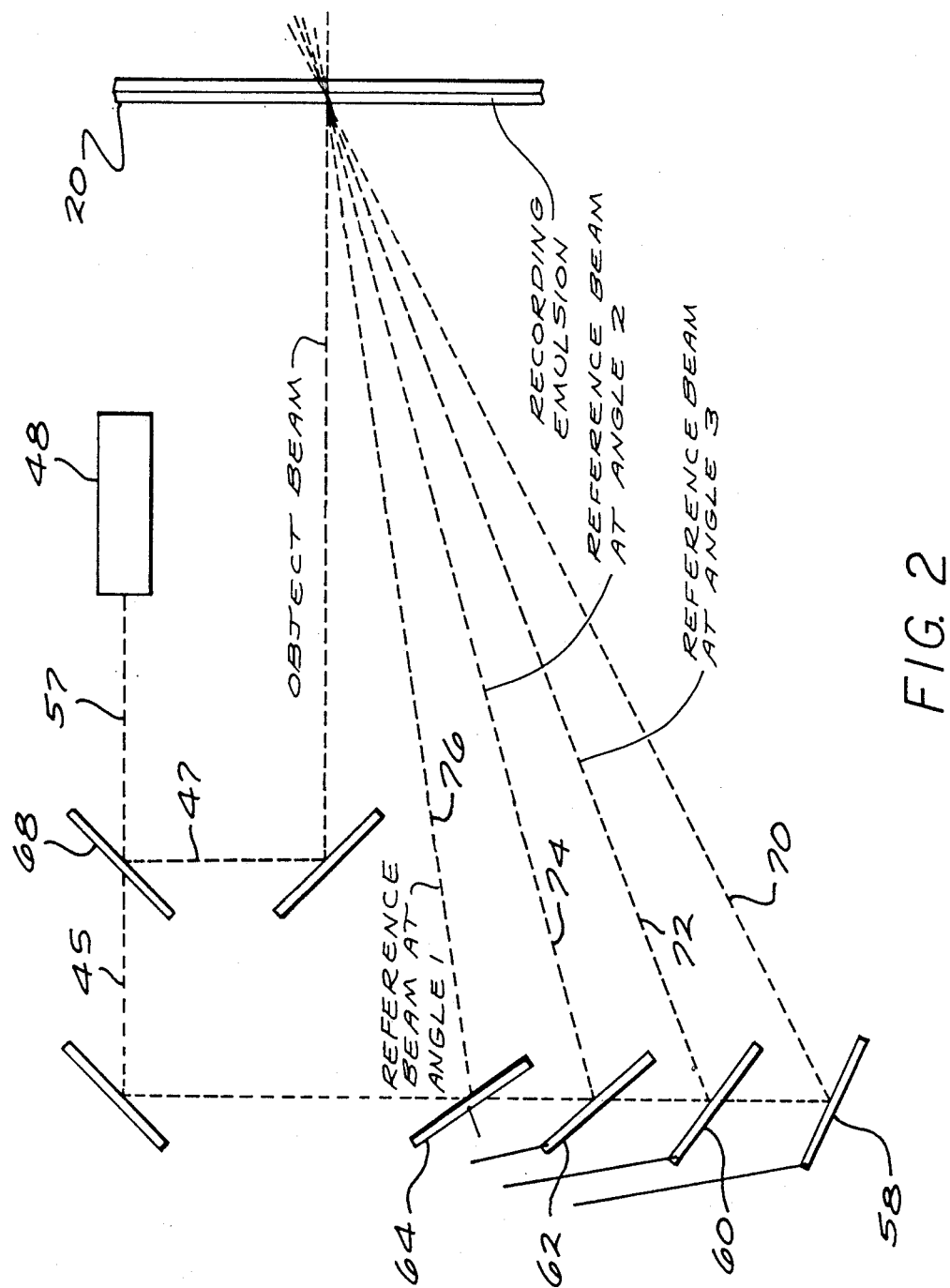
FIG. 2 is a schematic representation of the optical read/write head 26 shown in FIG. 1.
Figure 3:
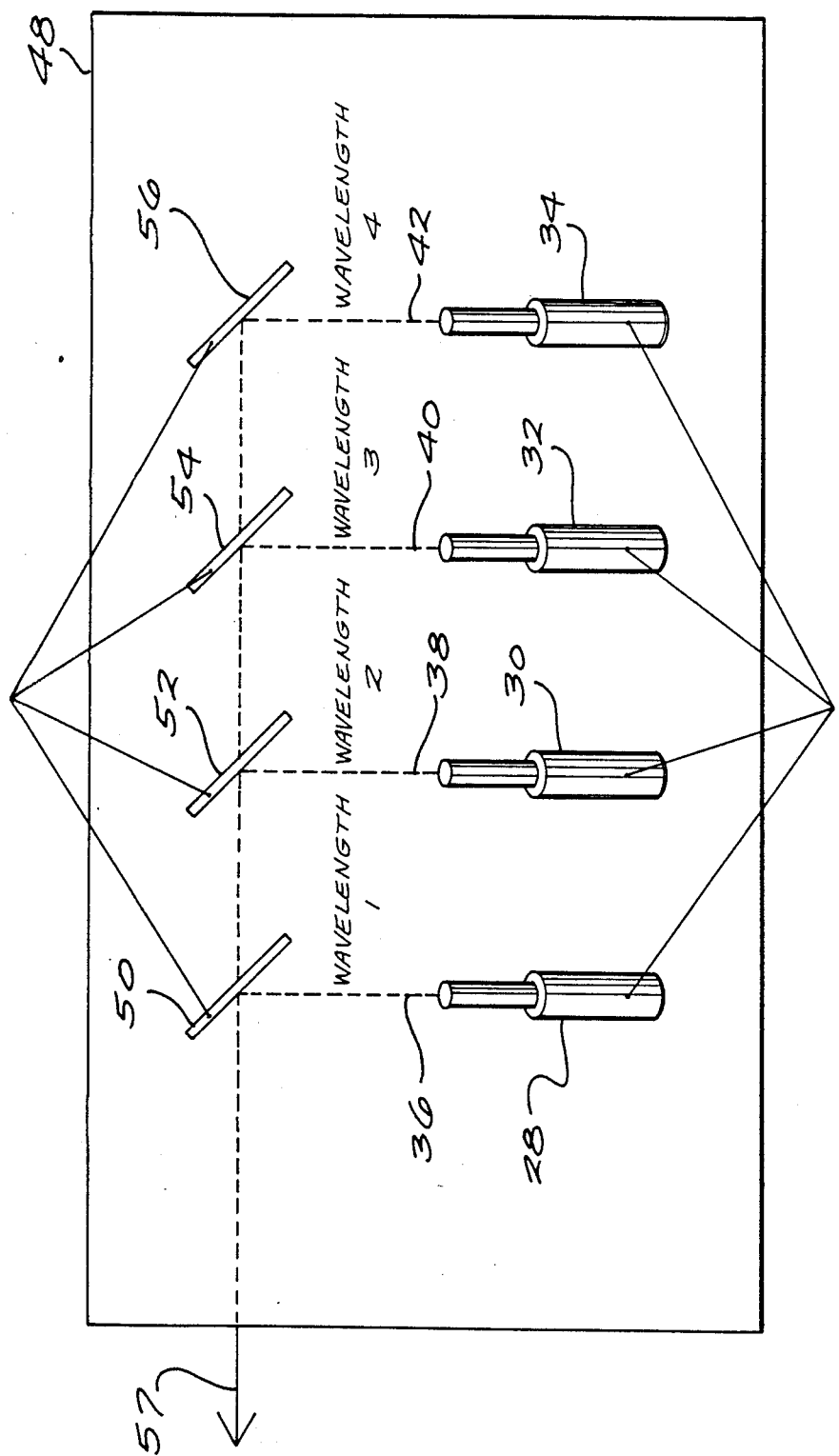
FIG. 3 is a schematic representation of a laser source forming a portion of the read/write head in FIG. 2.

As best shown in FIGS. 2 and 3, the read/write head 26 of FIG. 1 includes a bank 48 of monochromatic, or narrow wave-band laser light sources 28, 30, 32, 34 which project optical signals 36, 38, 40 and 42, respectively. Each of the optical signals has a respectively distinct wavelength. The optical signals are combined into a single beam-path 57 by dielectric mirrors 50, 52, 54 and 56, where they are sent to beam-splitter 68 (FIG. 2).

Each signal 36, 38, 40 and 42 in the common path 57 is split into a reference signal 45 and an object signal 47. Four dielectric mirrors 58, 60, 62, 64 are serially located in the path of the reference beam 45. The mirrors 58, 60, 62, 64 are positioned to reflect a portion of the incident reference signal 45 to a common point on the surface 22 of recording surface 22; however, the reference beam reflected from each of the mirrors impinges on the recording surface at a respective angle of incidence which is different than the angles of incidence of the reference beams portions reflected from the other mirrors. Thus, the reference beam reflected from mirror 64 is incident on the surface 22 at an angle of A1, the beam from mirror 62 is incident at angle A2, and so forth.

By mounting read/write head 26 on a movable arm 36 (FIG. 1) and rotating disk 20, as is done with current optical and magnetic disk drive systems, any point on side 22 of disk 20 may be accessed.

As illustrated in FIG. 3, the beam occupying the path 57 in FIG. 2, and forming the reference beam 45, is a combination of narrow bandwidth optical signal emanating from a plurality of lasers 28, 30, 32, 34. To record a value representative of an input value, one or more of the lasers are selectively triggered while the reflectance of dielectric mirrors 58, 60, 62 and 64 is regulated. Consequently, the reference signals can be emitted at any or all of the four wavelengths and at any or all of the four angles-of-incidence. As a result, signals 70, 72, 74 and 76 which are incident at the common point on recording surface, are compound signals containing components from any or all of light sources 28, 30, 32 and 34.

Thus, two properties (or dimensions) of the optical signal are varied, with each of the properties having any or all of four levels: the angle-of-incidence, at level A1, A2, A3 or A4; and the wavelength, as frequencies F1, F2, F3, F4.

The various properties and level combinations of each property are then recorded, in a multiplexed manner, within each storage location 25, 27, 29 on the recording medium as an optical hologram. As the components of signals 70, 72, 74 and 76 interact with object beam 47 at the impingement point on the medium, patterns of interference fringes are formed on the medium's emulsion layer 24.

In the present embodiment, each level in the multiplexed combination is recorded only if it is in the "on" state. Since optical holography and the recording of multiple signals in one hologram, per se, is well known, details concerning the design of holographic read/write apparatus are omitted herein for brevity.

To retrieve the data from the disk 20, a reverse process is utilized Each bit 25, 27, 29, on the disk is evaluated by illuminating it at each level combination for each reference signal 70, 72, 74 and 76. Thus, a storage bit location on the disk, which is of interest, is illuminated at each of the four angles A1, A2, A3, A4 at each of the four frequencies F1, F2, F3, F4. Those angle/frequency combinations which re-create the object signal 47 are deemed to be "on"; that is, that light which was incident on the disk at those angles was stored at the bit during the recording process. The presence of the object beam is detected by photodetector means 44. Naturally, one could alternatively illuminate the disk along the path of the object beam, and detect the re-created reference beams at the respective angles from the bit.

Having described the writing and reading techniques, per se, employed by the subject system, attention is next directed to the interrelationship between the multiplexed values, and their correlation to the values of the input data. Turning first to the conversion of input data 16 (FIG. 1) into the codes which a utilized by the present invention, the incoming data is processed as a serial stream of data units. For example, textual data is processed as a string of standardized digital codes, such as the eight-bit ASCII or IBM/EBCDIC codes commonly used with binary digital computing equipment. Numeric data can be processed as a series of "words'"—that is, the 8, 16, 32 or 64 bit groupings used to represent numbers in binary digital computers.

To record digital data with a holographic bit, the bit is treated as a physical counting register. This is done by assigning a fixed, hierarchical sequence to the combination of reference signal properties, as well as to the levels at which each property can be recorded. Counting with this system, for example, is roughly analogous to counting with a decimal digit string, wherein each property (e.g., angle, wavelength) represents a digit and the various levels of each property (e.g., A1, A2 . . . , and F1, F2 . . . ) represent the range of values that a digit may hold.

The hierarchical aspect of the data-representative system herein is created by incrementing the designated lowest order property through its range of levels and level combinations prior to incrementing the value of the next more significant property by one, and initializing the lower order properties for a repeated cycle of incrementation.

In the present embodiment, the wavelength is designated as the lowest order property, and the angle-of-incidence is designated as the higher order property. The recording levels for angle-of-incidence are: A1, A2, A3 and A4 degrees, sequenced from lowest to highest. The lowest-to-highest sequence of wavelength levels is frequency F1, F2, F3 and F4. FIG. 5 is a diagrammatic representation illustrating the the quantizing method used at a single bit location on the recording medium in accordance with the present embodiment. Four angles-of-incidence are represented in descending order of value as "A4", "A3", "A2" and "A1", as described above. For each higher order value A, there are four lower order values "F4", "F3", "F2" and "F1" in descending order. The symbol "*" indicates a frequency level that is "on" at a particular angle-of-incidence, and "0" indicates "off".

As shown in FIG. 5, the decimal number "0" is represented by "0" at all frequencies, and all angles. Since the hierarchical order of the properties has been defined as angles A4, A3, A2, A1 and then frequencies F4, F3, F2, F1, the decimal number "1" is accordingly represented by incrementing F1 of A1 from "0" to "*", while holding all other frequencies and angles the same. In order to represent the decimal number "2", the next frequency level, F2 of A1 is incremented from "0" to "*", and F1 is initialized to "0"—all of this occurring within angle A1. Decimal "3" is accordingly represented by an optical signal of F2 and F1 at angle A1. Quantizing continues in this manner until all frequency levels of A1 are "on" (i.e., reside in the "*" condition), recording the decimal number "15".

With all of the quanta at angle-of-incidence A1 exhausted, decimal "16", is represented by incrementing the frequency level F1 of angle A2 from "0" to "*", while F4, F3, F2 and F1 of angle A1 are initialized back to "0". By quantizing in this manner, through all angles and frequencies, the single holographic bit represented in FIG. 5 can represent numbers up to decimal 65,536, at which point an additional holographic bit is needed.

Thus, as can be seen from an inspection of FIG. 5, numeric data is represented by multiplexing the frequency content of an optical signal and its angle(s)-of-incidence at an optical bit on the recording medium. As with binary digital systems, several of these multiplexed bits may be grouped together to form a multiplexed word sufficient to contain a number of any desired size.

Figure 4:
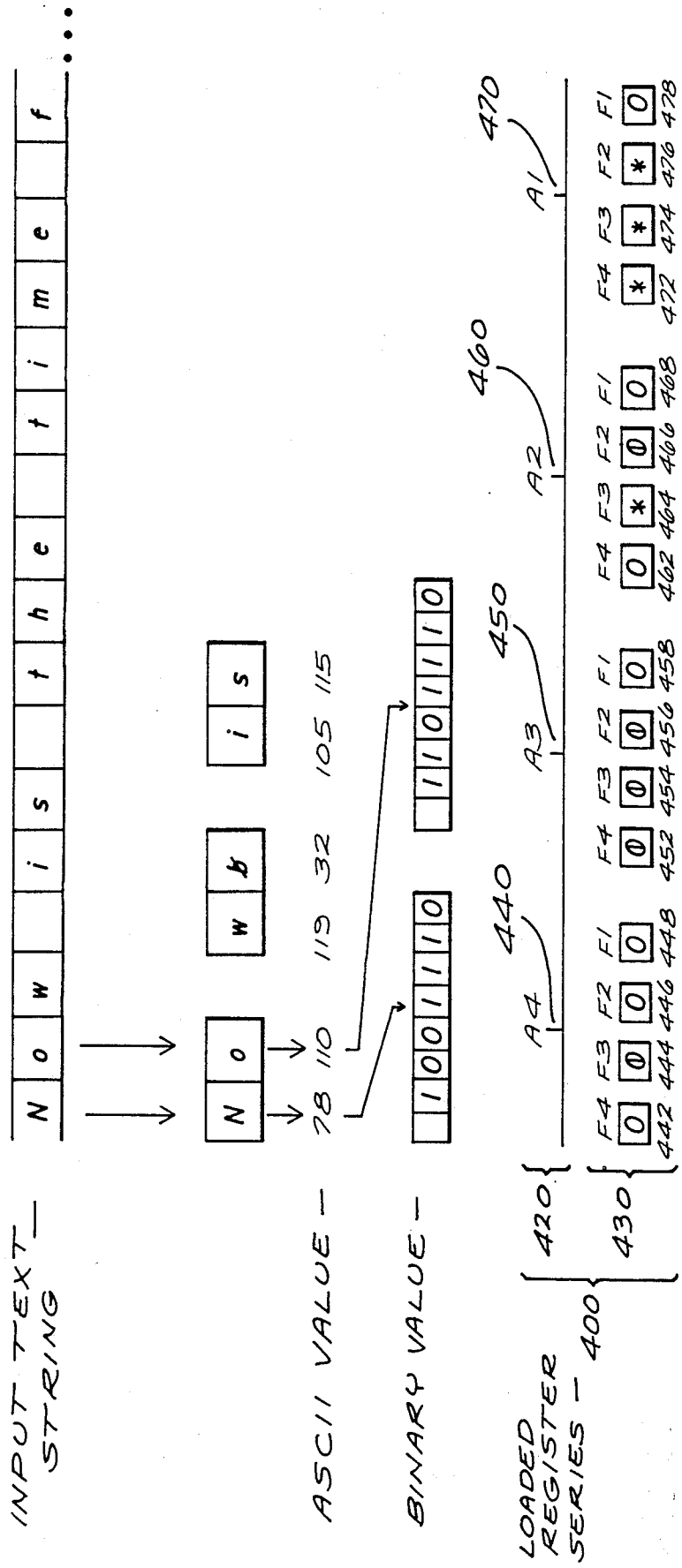
FIG. 4 is a diagrammatic representation illustrating the encoding of data prior to storage, in accordance with the invention.

It will now be evident that the encoder 14 (FIG. 1) simply converts the incoming digital data 16 into a set of values which determine the levels at which the several properties of the reference signal 45 are to be recorded, and passes those values to read/write head assembly 26. Turning to FIG. 4, an input string of data is represented in the first line of the Figure. The first letter, of example, has an ASCII value of $78_{10}$, or $1001110_2$. Its value is recorded herein as an optical signal of frequency F3 which is incident on the medium at an angle A2, together with optical signals of frequencies F4, F3 and F2 which are incident on the medium at angle A1. As is evident from an inspection of FIG. 5, the invention in the illustrated embodiment can represent the 128 characters of the ASCII character set using only two of the angle-of-incidence levels. Accordingly, coding alogrithms of greater complexity can achieve greater data density.

A series of registers 400 forming part of the encoder 14 (FIG. 1) are represented at the the bottom of FIG. 4. Each of the registers is associated with a respective combination of lower and higher order properties and/or levels (each of which is associated with integer values of successive orders of magnitude so that each recordable combination of properties and levels has an associated combination of registers which store the appropriate digital values to control. Thus, the register 464 associated with F3 at angle A2 contains a value, such as a digital "1", indicative of the "ON" state of that optical signal at that angle. Similarly, registers 472, 474, 476 contain "ON"-indicative values, while the remaining registers contain values indicative of the "OFF" state.

The difference in storage capacity between a conventional binary digital system and the illustrated two-property, multiplexed system is evident. A binary storage bit can reside in two states, while each of the illustrated optical bits exists in 65,536 states, yielding a data representation system of base 65,636. The disclosed system may be used, of course, in conjunction with a recording signal of greater complexity. For example, additional properties such as intensity and polarization, and additional levels of angles-of-incidence and frequencies, and other added properties can all be used. In practice, the number of quanta per storage unit is limited only by the ability of the hardware and storage media to record and then distinguish light signals of the various multiplexed properties and levels.

Storage capacity undergoes a rapid increase as the number of properties and levels are increased. For example, a system which utilizes 10 reference signal properties, each recordable at 10 levels, produces a reference signal having 1024-to-the-1,000,000,000th combinations (roughly one followed by three billion zeros). A single bit would therefore be capable of representing any digital number up to and including that magnitude. Note that 10 gigabits (10 billion binary bits) of binary digital memory would be required to store a comparable amount of information.

Those skilled in the art will recognize that numerous variations of the illustrated embodiment are possible. For example; disk 20 may use a reflective rather than a transmissive base layer, so that both sides of the disc can be used for data recording. Multiplexed logarithmic digitization might also be employed in single or multiple fiber-optical data transmission systems to substantially increase data transmission rates. Multiplexed central processing unit (CPU) registers may also be utilized to increase processing speed and representational power in main memory. Additional information is also found in my copending patent application which was filed on Dec. 1, 1986 and assigned Ser. No. 936,237. The content of that application is hereby incorporated by reference.

I claim:

1. A data storage system for converting a series of discrete units of incoming signal data into a single unit of stored information at a specific location of a data storing medium comprising:

means for producing energy having a plurality of independently variable properties susceptible to recordation;

means responsive to the units of incoming signal data for quantizing at least some of the variable properties at at least one of a plurality of quantization levels and in accordance with a hierarchical order between the properties and between the levels of each such property so that each recordable data value of the incoming signal corresponds to a respective unique combination of quantized properties; and means for recording the combination of quantized properties in a superimposed manner at the same storage location on the data-storing media.

2. The system of claim 1 wherein said energy-producing means includes laser means for producing an optical beam having a selectable number of spectral components of respectively different wavelengths, and wherein the quantizing means is responsive to the value of the incoming data to selectively quantize the spectral components for superimposed recordation.

3. The system of claim 2 wherein said quantizing means includes beam splitting means for dividing the optical beam into a selected number of beam portions, means for establishing a respective optical path for said beam portions, each path being incident at a common point on the recording medium with the other optical paths, but having a unique angle of incidence with the recording medium, and means for directing a selected number of optical beam portions at the recording medium along a selected number of beam paths in accordance with the value of the incoming data for superimposed recordation.

4. The system of claim 2 wherein said quantizing means includes beam splitting means for dividing the optical beam into a selected number of beam portions, means for establishing a respective optical path for said beam portions, each path being incident at a common point on the recording medium with the other optical paths, but having a unique angle of incidence with the recording medium, and means for directing a selected number of optical beam portions at the recording medium along a selected number of beam paths in accordance with the value of the incoming data for superimposed recordation.

5. The system of claim 2 wherein said quantizing means includes multichromatic beam producing means for producing a plurality of beams having respectively unique spectral components;

means for establishing a plurality of optical paths for each of said unique spectrum beams, each path being incident at a common point on the recording medium with the other optical paths, but at a unique angle of incidence with the recording medium;

means for directing a selected number of the unique spectrum beams at the recording medium along a selected number of beam paths in accordance with the value of the incoming data for superimposed recordation.

6. The system of claim 1 wherein said quantizing means includes multichromatic beam producing means for producing a plurality of beams having respectively unique spectral components;

means for establishing a plurality of optical paths for each of said unique spectrum beams, each path being incident at a common point on the recording medium with the other optical paths, but at a unique angle of incidence with the recording medium;

means for directing a selected number of the unique spectrum beams at the recording medium along a selected number of beam paths in accordance with the value of the incoming data for superimposed recordation.

7. A data storage system for converting a series of discrete units of incoming signal data into a single unit of stored information at a specific location of a data storing medium comprising:

means for producing energy having a plurality of independently variable properties susceptible to recordation, the properties being distinctly detectable when recorded in superimposition, the properties each being recordable at at least two distinctly detectable superimposable recordation values;

means responsive to values of incoming signal unit data for quantizing the properties at recordable values in accordance with an inter-property hierarchical order between property values so that each value of incoming signal unit data corresponds to a respective unique combination of quantized property values; and means for recording the combination of quantized property values in a superimposed manner at the same storage location on the data-storing media.

* * * * *